US007615089B2

(12) United States Patent
Oh

(10) Patent No.: US 7,615,089 B2
(45) Date of Patent: Nov. 10, 2009

(54) FILTER ASSEMBLY AND CYCLONE DUST COLLECTING APPARATUS HAVING THE SAME

(75) Inventor: Jang-keun Oh, Gwangju (KR)

(73) Assignee: Samsung Gwangju Electronics Co., Ltd., Gwangju (KR)

( * ) Notice: Subject to any disclaimer, the term of this patent is extended or adjusted under 35 U.S.C. 154(b) by 568 days.

(21) Appl. No.: 11/331,873

(22) Filed: Jan. 13, 2006

(65) Prior Publication Data

US 2006/0236663 A1 Oct. 26, 2006

(30) Foreign Application Priority Data

Apr. 22, 2005 (KR) ...................... 10-2005-0033707

(51) Int. Cl.
*B01D 50/00* (2006.01)

(52) U.S. Cl. ........................ 55/337; 55/459.2; 55/459.3; 55/DIG. 3; 55/345; 15/347; 15/353

(58) Field of Classification Search .................. 55/337, 55/447, 442, 323, 325, 521, 492, 520, 529, 55/418, 459.2, 459.3, 345, 321, DIG. 3; 15/347, 15/353

See application file for complete search history.

(56) References Cited

U.S. PATENT DOCUMENTS 964,428 A 7/1910 Johnson et al.
2,804,169 A 8/1957 Olah
2005/0050863 A1* 3/2005 Oh .............................. 55/345
2006/0137309 A1* 6/2006 Jeong et al. ................... 55/337

FOREIGN PATENT DOCUMENTS

| | | |
|---|---|---|
| DE | 2361995 | 6/1975 |
| DE | 102004028677 | 3/2005 |
| EP | 0815788 | 1/1998 |
| GB | 2326360 | 12/1998 |
| GB | 2406067 | 3/2005 |
| KR | 1020030094873 | 12/2003 |
| SU | 423515 | 4/1974 |
| SU | 588005 | 1/1978 |
| WO | WO 03/030702 | 4/2003 |

OTHER PUBLICATIONS

European Search Report dated Jul. 16, 2007 corresponding to European Patent Application No. 06290222.6-2316.
Office Action dated Aug. 14, 2007 corresponding to Russian Patent Application No. 2006104731.

* cited by examiner

*Primary Examiner*—Duane Smith
*Assistant Examiner*—Dung Bui
(74) *Attorney, Agent, or Firm*—Ohlandt, Greeley, Ruggiero & Perle, L.L.P.

(57) ABSTRACT

A filter assembly and a cyclone dust collecting apparatus using the same are provided. The filter assembly is employed by a cyclone dust collecting apparatus which centrifugally separates contaminant from drawn-in air to remove the contaminant and filters and discharges the air and has a filter part, and an air path. The air path is formed in the filter part to guide the air into the filter part and enables the air to flow in a three-dimensional direction, in other words, in a perpendicular direction to a central axis of the filter part, simultaneously flow in a parallel direction with the central axis of the filter part.

9 Claims, 6 Drawing Sheets

FILTER ASSEMBLY AND CYCLONE DUST COLLECTING APPARATUS HAVING THE SAME

CROSS-REFERENCE TO RELATED APPLICATIONS

This application claims the benefit of Korean Patent Application No. 2005-33707 filed on Apr. 22, 2005, in the Korean Intellectual Property Office, the disclosure of which is incorporated herein by reference in its entirety.

BACKGROUND OF THE INVENTION

1. Field of the Invention

The present invention relates to a dust collecting apparatus. More particularly, the present invention relates to a cyclone dust collecting apparatus for a vacuum cleaner in which dust and alien substance (hereinafter, contaminant)-laden air forms a rotating stream and contaminant can be separated from the rotating stream by centrifugal force, and a filter assembly employed by the cyclone dust collecting apparatus.

2. Description of the Related Art

FIG. 1 is a schematic view of a general cyclone dust collecting apparatus for a vacuum cleaner.

The cyclone dust collecting apparatus 10 comprises a cyclone body 11 which is a cyclone separator, a suction port 12 for drawing in contaminant-laden air, a discharge port 13 for discharging air separated of contaminant, a grille member which is a kind of filter and fluidly communicated to the discharge port 13, and a contaminant receptacle 15 for storing the contaminant separated from air.

Although not shown, the suction port 12 is fluidly communicated with a suction brush of the vacuum cleaner, and the discharge port 13 is fluidly communicated with a motor driving chamber having a suction motor of the vacuum cleaner.

The operation of the cyclone dust collecting apparatus 10 will be explained as below.

The suction port 12 is tangentially connected with an inner circumference of the cyclone body 11 so that air can form a rotating stream and descend along the inner circumference as introduced via the suction port 12 into the cyclone body 11. The air and contaminant are individually influenced by different centrifugal force to be separated from each other due to weight difference. Relatively greater-weighted contaminant than air is guided to the inner circumference of the cyclone body 11 to be collected into the contaminant receptacle 15 by the rotating stream and the self-weight.

Forming an ascending stream by a suction force of a suction motor (not shown), the air centrifugally-separated of the contaminant passes the grille member 14 to discharge via the discharge port 13 to the outside of the cyclone dust collecting apparatus 10.

The grille member 14 prevents the contaminant collected in the contaminant receptacle 15 from flowing backward and discharging to the outside, or filters minute contaminant, which is not centrifugally-separated. The grille member 14 may take on various configurations. Referring to FIG. 2, the grille member 14 generally has a cylindrical body 16, an opened top end connected to the discharge port 13, and a closed bottom end. The cylindrical body 16 has a plurality of air pores 17 for passing air.

The general cyclone collecting apparatus 10 has the grille member 14 to increase a dust collection efficiency. However, the grille member 14 reduces a suction performance of the vacuum cleaner. To maintain a proper suction force due to the reduction of suction performance, the suction power of suction motor should increase, thereby causing an increase of power consumption. Recently, a multi cyclone dust collecting apparatus was developed to increase the collection efficiency of minute dust, in which contaminant is centrifugally-separated from air in a two step process. It is more important to maintain the suction performance of the multi cyclone dust collecting apparatus.

Accordingly, it requires more air pores for air to pass in size or cross section as given in the design stage of the grille member 14.

SUMMARY OF THE INVENTION

The present invention has been conceived to solve the above-mentioned problems occurring in the prior art, and an aspect of the present invention is to provide a filter assembly which provides a maximum capacity of air passing in a size or cross section set in the process of design so that a suction performance of a vacuum cleaner can increase, and a cyclone dust collecting apparatus employing the same.

In order to achieve the above aspects, there is provided a filter assembly for a cyclone dust collecting apparatus which centrifugally separates contaminant from drawn-in air to remove the contaminant, and filters and discharges the air, comprising a filter part, and an air path formed around the filter part to guide the drawn-in air into the filter part and allows a first portion of the drawn-in air to flow in a perpendicular direction to a central axis of the filter part, and a second portion of the drawn-in to flow in a parallel direction to the central axis of the filter part.

The filter part may comprise a spiral member in a forward direction of a flow of the air.

The filter part may be a spiral in a forward direction of a flow of the drawn-in air.

The filter assembly may further comprise a connection part connected with an end of the filter part to connect with a cyclone body of the cyclone dust collecting apparatus.

The filter part may be coaxially arranged and has a gradually smaller diameter as farther from the connection part.

The filter assembly may further comprise a supporting rib formed in the central axis direction of the filter part to support the filter part.

The filter part may comprises a plurality of ring members with each different diameter are sequentially arranged in the central axis direction of the filter part so as not to be overlapped each other.

The filter assembly may further comprise a connection part connected with a top end of the filter part to connect with the cyclone body of the cyclone dust collecting apparatus.

The ring members may be coaxially arranged and have a diameter that decreases in a direction away form the connection part.

The filter assembly may further comprise a supporting rib formed in the central axis direction of the filter part to support the plurality of ring members.

The filter assembly may further comprise a plurality of slits formed between the filter part and the connection part to further increase a flow capacity of the air.

In order to achieve the above aspects, there is provided a cyclone dust collecting apparatus comprises a cyclone body with an air inlet for drawing in contaminant-laden air, an air outlet for discharging the air to the outside, and a cyclone chamber for separating contaminant from the air drawn from the air inlet, and a filter assembly formed in the cyclone chamber to filter the air discharged from the air outlet.

The filter assembly comprises a connection part engaged with the air outlet, a filter part connected with a bottom end of the connection part and being a reverse-conical configuration which has a diameter that decreases in a direction away from the connection part, and an air path formed around the filter part to guide the air into the filter part, and for the air to flow in a perpendicular direction to a central axis of the filter part, simultaneously in a parallel direction with the central axis of the filter part.

BRIEF DESCRIPTION OF THE DRAWINGS

The above and other aspects, features and advantages of the present invention will be more apparent from the following detailed description taken with reference to the accompanying drawings, in which.

DETAILED DESCRIPTION OF THE EXEMPLARY EMBODIMENTS

Figure 1:
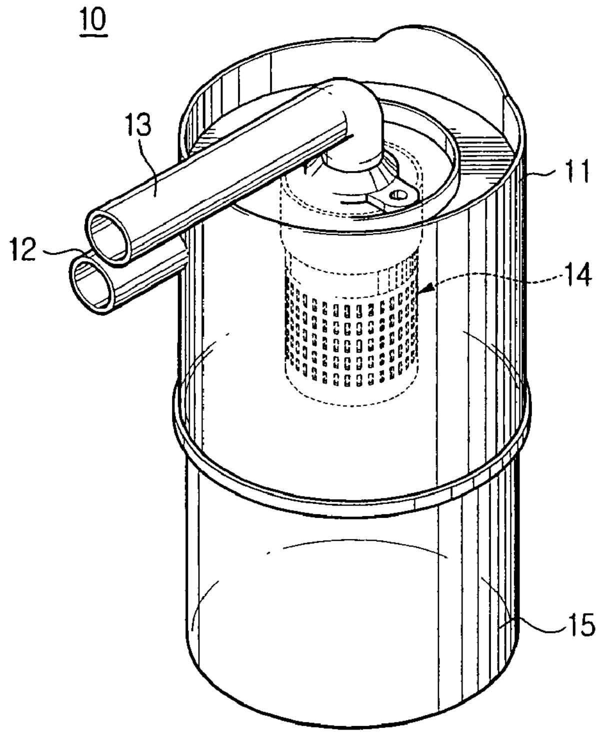
FIG. 1 (PRIOR ART)
FIG. 1 is a perspective view of a prior art cyclone dust collecting apparatus.
Figure 2:
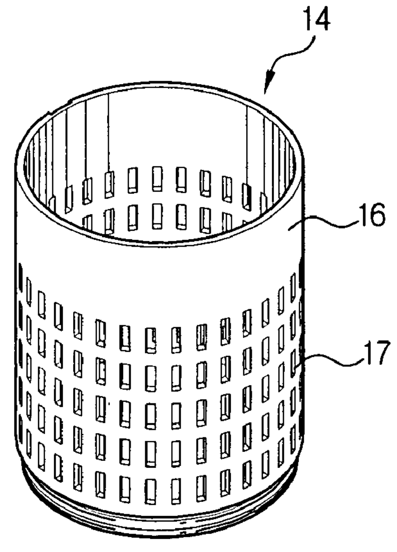
FIG. 2 (PRIOR ART)
FIG. 2 is a perspective view of a filter assembly employed by the prior art cyclone dust collecting apparatus of FIG. 1.

Certain embodiments of the present invention will be described in greater detail with reference to the accompanying drawings.

In the following description, same drawing reference numerals are used for the same elements even in different drawings. The matters defined in the description such as a detailed construction and elements are nothing but the ones provided to assist in a comprehensive understanding of the invention. Thus, it is apparent that the present invention can be carried out without those defined matters. Also, well-known functions or constructions are not described in detail since they would obscure the invention in unnecessary detail.

Figure 3:
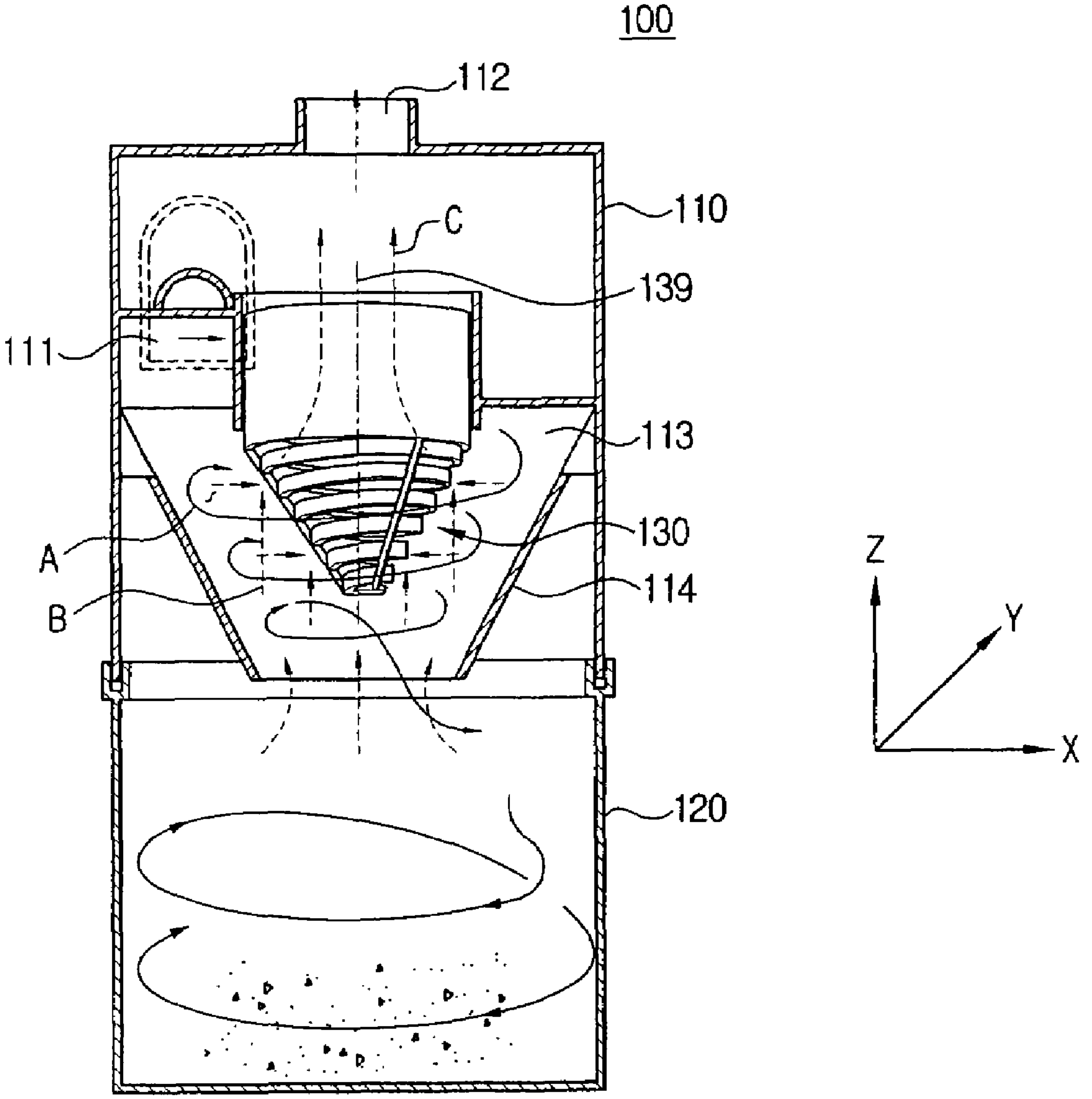
FIG. 3 is a cross-section view of a cyclone dust collecting apparatus according to an exemplary embodiment of the present invention.

FIG. 3 is a view of a cyclone dust collecting apparatus 100 employing a filter assembly according to an embodiment of the present invention. The cyclone dust collecting apparatus 100 comprises a cyclone body 110, a contaminant receptacle 120, and a filter assembly 130 provided in the cyclone body 110.

The cyclone body 110 has an air inlet 111 for drawing in contaminant-laden air from a cleaning surface, and an air outlet 112 for discharging air separated from contaminant toward a cleaner body (not shown) at a top portion of the cyclone body 110.

A cyclone chamber 113 is provided in the cyclone body 110 to separate contaminant from drawn-in air. The cyclone body 110 has a conical inner wall 114 with a gradually smaller diameter to the lower side. The configuration of the inner wall 114 corresponds to that of a filter member 131 of the filter assembly 130, and therefore, the cyclone chamber 113 is reverse-conical. However, one will appreciate that the inner wall 14 can be applied to other various types, and is not limited to the reverse-conical configuration.

The contaminant receptacle 120 is detachably attached to a bottom surface of the cyclone body 110 to collect contaminant separated from the drawn-in air in the cyclone chamber 113.

The filter assembly 130 provides in the cyclone chamber 113 of the cyclone body 110 to prevent the contaminant centrifugally-separated by the cyclone chamber 113 from discharging to the outside.

Figure 4:
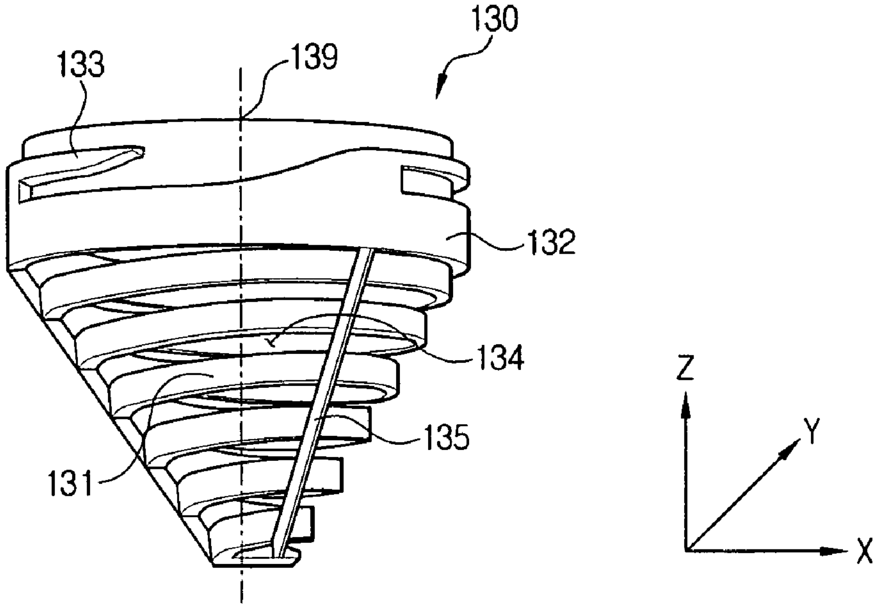
FIG. 4 and FIG. 5 are each a front view and a plan view of the filter assembly employed by the dust cyclone dust collecting apparatus of FIG. 3.
Figure 5:
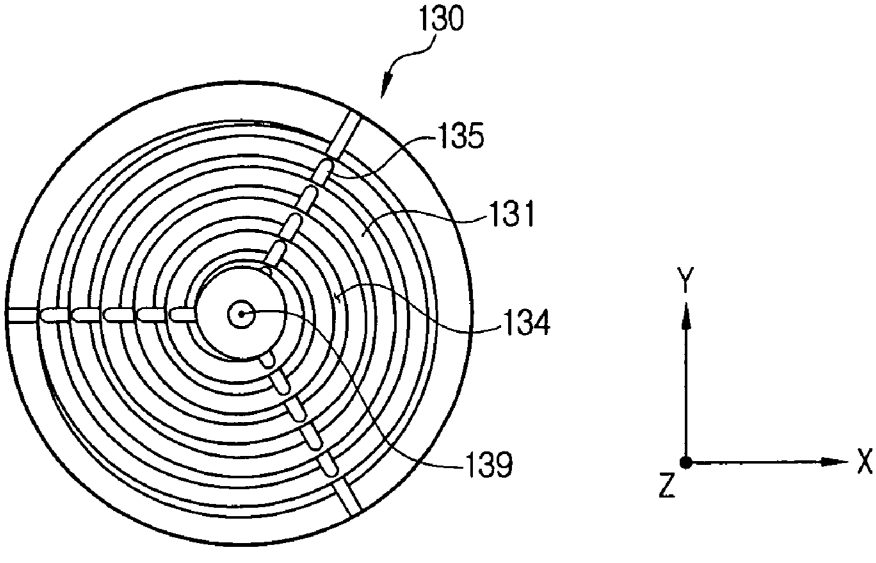

Referring to FIGS. 4 and 5, the filter assembly 130 comprises the filter part 131, a connection part 132, and an air path 134 formed around the filter part 131.

The connection part 132 is cylindrical and connected to the cyclone body 110 to fluidly communicate with the air outlet 112. The connection part 132 has a connection protrusion 133 to connect with a groove (not shown) of the cyclone body 110. However, the filter assembly 130 may be directly connected to the cyclone body 110 by bonding without the connection part 132.

The filter part 131 is reverse-conical, in other words, has a gradually smaller diameter as further distanced from the connection part 132 based on the same central axis 139. Due to the reverse-conical structure, contaminant can freely fall or be easily removed as the contaminant is not centrifugally separated but stuck to the filter part 131.

The filter part 131 is formed of a spiral member in a forward direction of a flow of rotating air stream in the cyclone chamber 113 (refer to FIG. 3). Forming a rotating stream, air flows and descends. The filter part 131 is formed in a forward direction of the air flow so as not to easily rub against air. Accordingly, air may more smoothly flow. The filter part 131 may have a spiral structure by integrating with one member or by connecting a plurality of members.

In one exemplary embodiment, the filter part 131 has a plurality of supporting ribs 135 in the central axis 139 direction, that is a lengthwise direction of the filter part 131 at an outer surface to support the filter part 131. The thickness of one supporting rib 135 and the interval between supporting ribs 135 may be properly maintained so as not minimize interference with the flow capacity of air passing the filter part 131.

An air path 134 is formed around the filter part 131 so that air forming a rotating stream in the cyclone chamber 113 and air ascending from the contaminant receptacle 120 to the cyclone chamber 113 are guided into the filter part 131. The filter part 131 has a spiral structure, and therefore, the air path 134 also has a spiral structure (refer to FIG. 5). The air path 134 is formed in a perpendicular direction (X, Y direction) to the central axis 139 of the filter part 131 and a parallel direction (Z direction) with the central axis 139 of the filter part 131. Air flows into the filter part 131 in the three-dimensional direction by the air path 134. In other words, air flows into the filter part 131 in the parallel direction (Z direction) with the central axis 139 of the filter part 131 as well as in the perpendicular direction (X, Y direction) to the central axis 139 of the filter part 131. The interval between the air paths 134 may be properly formed so as to well filter contaminant.

The filter assembly 130 according to an embodiment of the present invention has a three-dimensional air path structure so that a maximum area for air passing in a size or cross-section set in the process of design can be obtained. Accordingly, a suction capability of the suction motor can be very much improved.

The inner wall 114 of the cyclone chamber 113 with the filter assembly 130 is reverse-conical to correspond to the filter part so that the suction force can be more improved.

The operation of the cyclone dust collecting apparatus 100 according to an embodiment of the present invention will be described with reference to FIG. 3.

As the suction motor (not shown) drives, contaminant-laden air flows via the suction brush (not shown) into the cyclone dust collecting apparatus 100 of the vacuum cleaner. The contaminant-laden air flows via the air inlet 111 into the cyclone chamber 113 to form a rotating stream as shown in solid arrows A along the inner wall 114. Therefore, the contaminant is separated from air and collected in the contaminant receptacle 120.

The air centrifugally-separated of contaminant flows into the filter part 131 of the filter assembly 130 in a three-dimensional direction as shown in dotted arrows B. In other words, air flows in the perpendicular direction to the central axis 139 of the filter part 131 as well as in the parallel direction with the central axis 139 of the filter part 131. Due to the filter assembly 130 with the air path 134 drawing in air in the three-dimensional direction, the suction performance of the vacuum cleaner can be improved under the same power condition of the suction motor.

Air passing the filter assembly 130 is discharged via the air outlet to the outside of the cyclone dust collecting apparatus 100 as shown in solid arrows C.

Figure 6:
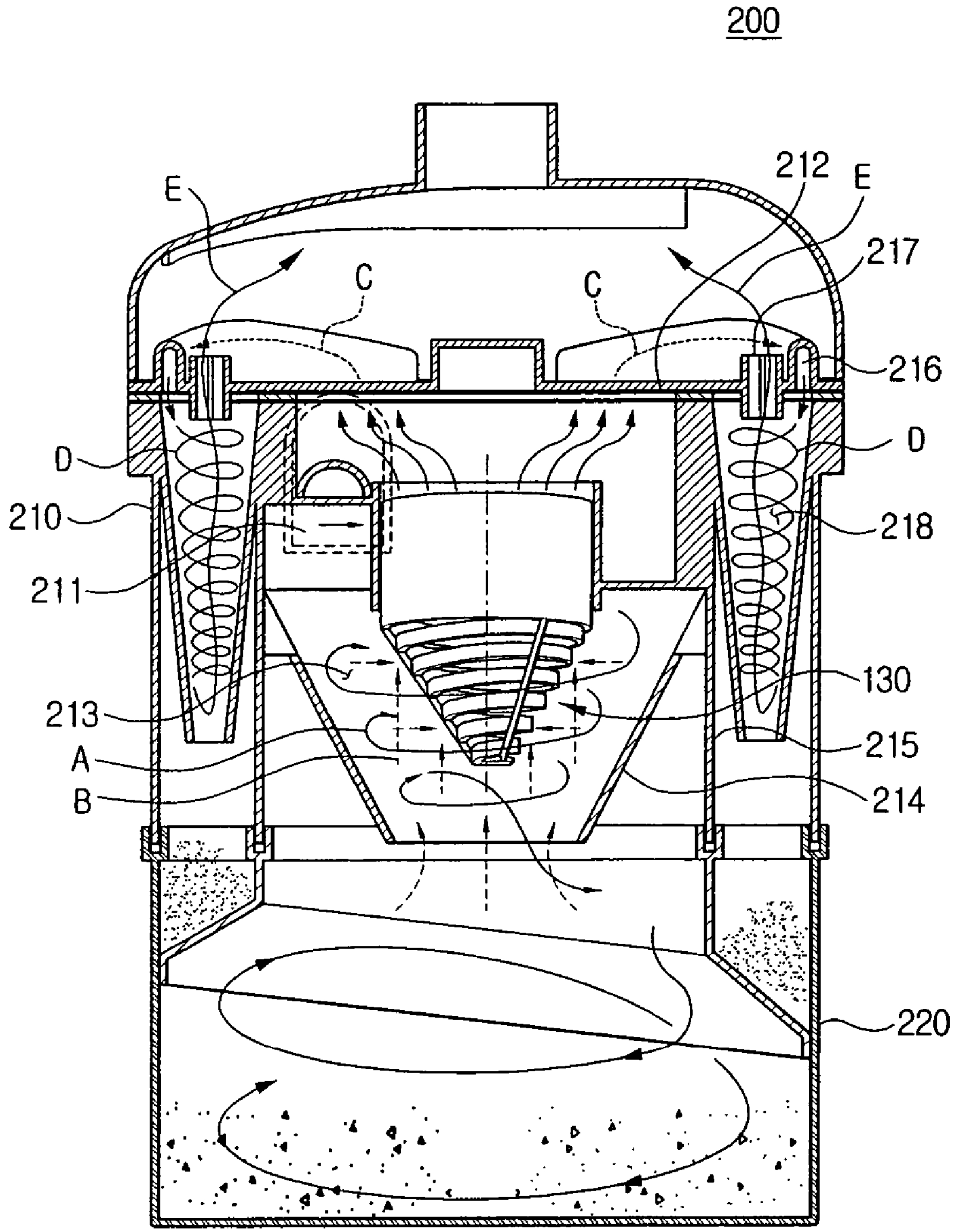
FIG. 6 is a cross-sectional view of a multi-clone dust collecting apparatus employing the filter assembly of FIG. 4 and FIG. 5.

The filter assembly 130 according to an embodiment of the present invention may be employed by a multi cyclone dust collecting apparatus. The multi cyclone dust collecting apparatus is developed to increase a dust collection efficiency, which filters contaminant in the process of over than two steps. FIG. 6 is a view of an example of a multi cyclone dust collecting apparatus 200 employing the filter assembly 130 according to an embodiment of the present invention.

Referring to FIG. 6, the cyclone body 210 comprises a primary cyclone chamber 213 for firstly filtering relatively large-sized contaminant, and a plurality of secondary chambers 218 for filtering minute contaminant in the air filtered by the primary cyclone chamber 213.

The primary cyclone chamber 213 and the secondary cyclone chambers 218 are separated by a partition member 215. The primary cyclone chamber 213 has the conical inner wall 214, which has a gradually smaller diameter to the lower side. The configuration of the inner wall 214 corresponds to the filter part 131 of the filter assembly 130, and therefore, the primary cyclone chamber 213 is also reverse-conical. The filter assembly 130 is formed in the primary cyclone chamber 213 so as to prevent large-sized contaminant centrifugally-separated by the primary cyclone chamber 213 from flowing into the secondary cyclone chambers 213.

The operation of the multi-cyclone apparatus 200 with the above construction will be described as below.

As the suction motor (not shown) of the vacuum cleaner drives, contaminant-laden air flows via the suction brush (not shown) into the multi-cyclone dust collecting apparatus 200. The air flowing in the cyclone dust collecting apparatus 200 flows via a first air inlet 211 to the primary cyclone chamber 213 to form a rotating stream as shown in solid arrows A. The relatively large-sized contaminant in the drawn-in air is centrifugally separated to be collected in the contaminant receptacle 220.

The air centrifugally-separated of the relatively large-sized contaminant flows into the filter assembly 130 in a three-dimensional direction as shown in dotted arrows B. In other words, air flows in the perpendicular direction to the central axis 139 of the filter part 131 as well as in the parallel direction with the central axis 139 of the filter part 131.

The air passing the filter assembly 130 flows out of a first air outlet 212 and flows via a second air inlet 216 into the secondary cyclone chamber 218 as shown in dotted arrows C. The air flowing in the secondary cyclone chamber 218 forms a rotating stream as shown in solid arrows D, and minute contaminant in air is centrifugally separated to be collected in the contaminant receptacle 220. Cleaned air removed of the minute contaminant flows via a second air outlet 217 out of the cyclone dust collecting apparatus 200 as shown in solid arrows E.

The filter assembly according to an embodiment of the present invention may be applied to the multi-cyclone dust collecting apparatus for increasing a dust collecting efficiency to fulfill its functions. In other words, a conventional multi-cyclone dust collecting apparatus increases the dust collecting efficiency; however, decreases a suction performance as the moving path of air lengthens. Therefore, much power consumption is required to increase the suction force. However, if the three-dimensional filter assembly according to an embodiment of the present invention is applied, the suction force can increase, and therefore, the power consumption can decrease. Additionally, the configuration of the primary cyclone chamber 213 with the filter assembly 130 is reverse-conical to correspond to the filter part 131 so that the maximum increase of suction force according to an embodiment of the present invention can be implemented.

Figure 7:
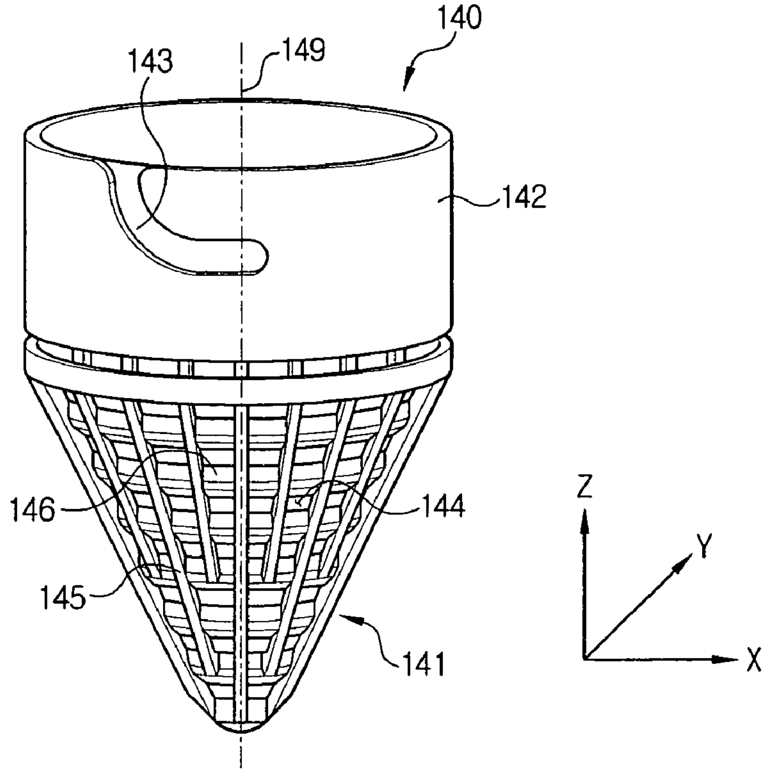
FIG. 7 is a front view of the filter assembly according to another embodiment of the present invention.
Figure 8:
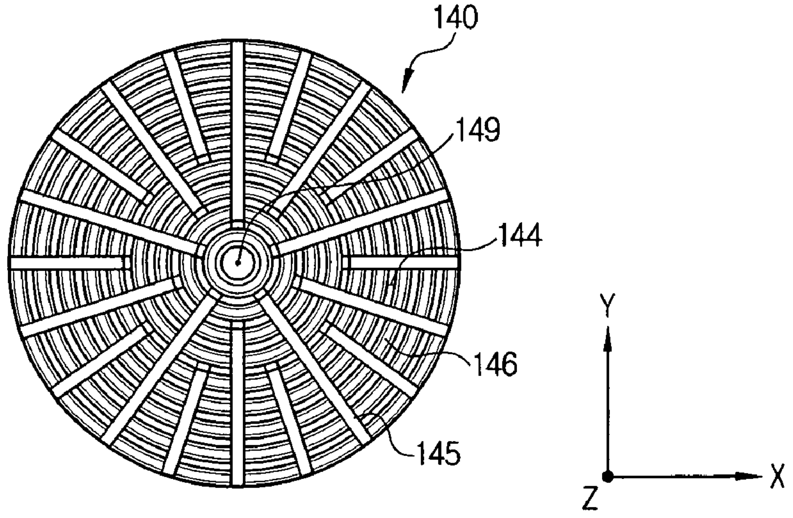
FIG. 8 is a plan view of the filter assembly of FIG. 7.

FIGS. 7 and 8 are views of the filter assembly 140 according to another embodiment of the present invention.

The filter assembly 140 according to an embodiment of the present invention comprises a filter part 141, a connection part 142, and air paths 144 around the filter part 141. The cylindrical connection part 142 is formed at a top portion of the filter body 141 to connect with the cyclone body 110 (refer to FIG. 3). The connection part 142 has a connection protrusion 143 to connect with a groove (not shown) of the cyclone body 110.

The filter part 141 according to another embodiment of the present invention has a plurality of ring members 146 arranged in a central axis 149 direction, that is a lengthwise direction of the filter part 141 and having each different diameter. The plurality of ring members 146 is coaxially arranged based on the central axis 149 in sequence and gradually from larger one to smaller one as farther from the connection part 142. The plurality of ring members 146 are arranged so as not to be overlapped in a direction of the central axis 149 of the filter part 141. A plurality of supporting ribs 145 are formed at an outer surface of the ring member 146 in a lengthwise direction of the filter part 141.

The plurality of air paths 144 are provided between each ring member 146 by the arrangement of the ring member 146. In other words, since the ring members 146 are not overlapped in a direction of central axis 149 of the filter part 141, the air path 144 is formed between ring members 146 in a parallel direction (Z direction) with the central axis 149 of the filter part 141 (refer to FIG. 7). The air path 144 is also formed between the ring members 146 in a perpendicular direction (X, Y direction) of the central axis 149 of the filter part 141 (refer to FIG. 8) since the ring members 146 are sequentially arranged gradually from a large diameter to a small diameter.

Air flows into the filter part 141 in a three-dimensional direction by the plurality of air paths 144. In other words, air flows in a perpendicular direction to the central axis 149 of the filter part 141 as well as in a parallel direction with the central axis 149. Therefore, the same effect can be achieved as the previous embodiment. The interval between the air paths 144 may be properly formed.

One will appreciate that the filter assembly 140 according to an embodiment of the present invention can be applied to both single cyclone dust collecting apparatus and multi cyclone dust collecting apparatus.

Figure 9:
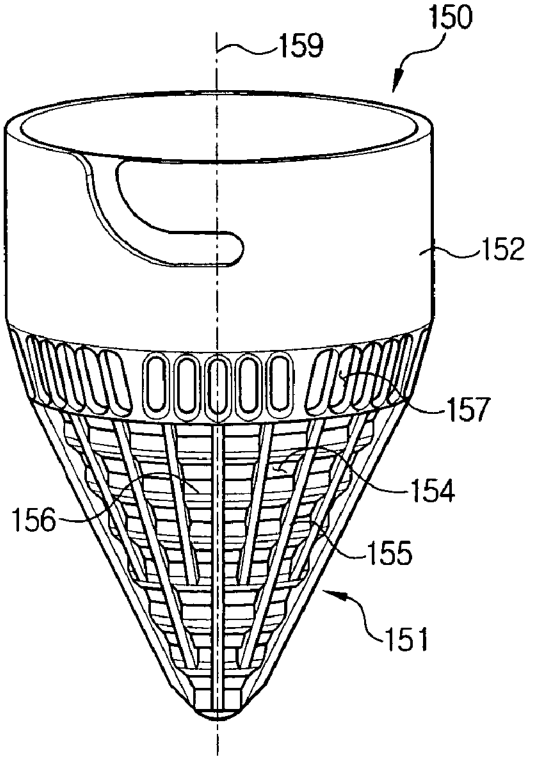
FIG. 9 is a front view of the filter assembly according to yet another embodiment of the present invention.
Figure 10:
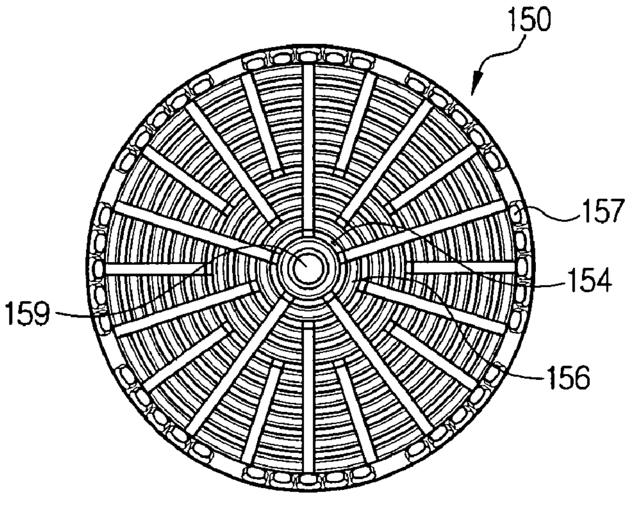
FIG. 10 is a plan view of the filter assembly of FIG. 9.

FIGS. 9 and 10 are views of a filter assembly 150 according to yet another embodiment of the present invention.

The filter part 151 according to an embodiment of the present invention has the same construction in that a plurality of ring members 156 with each different diameter are coaxially arranged based on the central axis 159 of the filter part 151 so as not to be overlapped, and that a plurality of supporting ribs 155 are arranged on an outer surface of the plurality of ring members 146 in a lengthwise direction of the filter part 151. Air paths 154 are formed between each ring member 156 to flow air into the filter part 151 in a three-dimensional direction.

The connection part 152 has at a bottom end a plurality of slits 157 in a circumferential direction. The plurality of slits 157 are formed in a lengthwise direction of the filter part 151. If the filter assembly 150 according to an embodiment of the present invention is applied, more cross section, as air passes the filter assembly 150, can be obtained due to the plurality of slits 157.

As described above, the filter assembly according to the present invention and the cyclone dust collecting apparatus using the same have a reverse-conical filter part and air path formed around the filter part to flow air in a three-dimensional direction so that more cross section, as air passes the filter assembly, can be obtained. Accordingly, since more airflow capacity can be obtained, compared to a set size and cross-section, the suction force increases and the power consumption decreases. Additionally, the inner wall of the cyclone chamber with the filter assembly is reverse-conical to correspond to the filter part of the filter assembly so that the effect of the present invention can be more improved.

The foregoing embodiment and advantages are merely exemplary and are not to be construed as limiting the present invention. The present teaching can be readily applied to other types of apparatuses. Also, the description of the embodiments of the present invention is intended to be illustrative, and not to limit the scope of the claims, and many alternatives, modifications, and variations will be apparent to those skilled in the art.

What is claimed is:

1. A filter assembly which is mounted in a cyclone chamber of a cyclone dust collecting apparatus, which centrifugally separates dust from drawn-in air, and filters out the remaining dust from the air being discharged from the cyclone chamber, the filter assembly comprising:

a filter part which comprises an air path along which the drawn-in air passes, wherein the air path guides a portion of the drawn-in air to flow in a direction perpendicular to the central axis of the filter part while another portion of the drawn-in air moves in a direction parallel to the central axis, and wherein the filter part comprises:

a spiral member which is formed coaxially with the filter part; and a plurality of support ribs which are formed across and are connected to the spiral member to support the spiral member.

2. The filter assembly according to claim 1, further comprising:

a connection part which is connected to one end of the filter part and to one side of the cyclone chamber.

3. The filter assembly according to claim 2, wherein the diameter of the spiral member decreases as the distance from the connection part increases.

4. The filter assembly according to claim 2, wherein the connection part has a cylindrical shape and is in fluid communication with an air outlet of the cyclone chamber.

5. The filter assembly according to claim 1, wherein the filter part has a conical shape.

6. The filter assembly according to claim 1, wherein the plurality of support ribs are arranged at regular angles around the spiral member.

7. A cyclone dust collecting apparatus, comprising:

a cyclone body which comprises a cyclone chamber which centrifugally separates dust from drawn-in air, an air inlet which guides the drawn-in air into the cyclone chamber, and an air outlet which discharges the air from which dust has been separated from the cyclone chamber, a filter assembly which is formed in the cyclone chamber and filters out the remaining dust from the air being discharged from the cyclone chamber, wherein the filter assembly comprises a filter part which comprises an air path along which the drawn-in air passes, and the air path guides the drawn-in air to flow in a direction perpendicular to the central axis and in a direction parallel to the central axis, and wherein the filter part comprises:

a spiral member which is formed coaxially with the filter part; and a plurality of support ribs which are formed across and are connected to the spiral member to support the spiral member.

8. The cyclone dust collecting apparatus according to claim 7, wherein the filter part has a conical shape.

9. The cyclone dust collecting apparatus according to claim 7, wherein a side wall of the cyclone chamber is formed in the cyclone body to have a conical shape corresponding to the shape of the filter part.

* * * * *